Patented Apr. 12, 1938

2,114,121

UNITED STATES PATENT OFFICE 2,114,121

FRICTION MATERIAL

Howard L. Bender, Bloomfield, N. J., assignor to Bakelite Corporation, New York, N. Y., a corporation of Delaware No Drawing. Application July 27, 1935, Serial No. 33,565

13 Claims. (Cl. 106—22)

This invention relates to friction elements, for instance, brake linings, clutch facings, etc. and the general object is such an element having improved characteristics of wear, stability and friction.

The type of friction element most generally used prior to this invention, included a filler such as asbestos, cork, etc. bound together with a binder of rubber or phenolic resin and modifiers. The difficulty has been to make a friction element which wears well but which will not change its characteristics during use. The phenolic resins have come into great favor for brake lining use but they are generally unsatisfactory unless modifiers are incorporated and, for the most part, they are incompatible with more than relatively small percentages of modifiers when the resins are in the most satisfactory condition, that is heat hardened, for use in friction elements.

The general object of the present invention is a friction element comprising a resinous material which may be used by itself as a binder for frictional fillers but which is also compatible with, and has a strong affinity for, lower cost binders and modifiers in case such materials are desired, and which will produce a heat hardened brake lining having the desired characteristics of long wear, friction and heat stability.

The friction element which is the subject matter of this invention, has practically no tendency to glaze under continued use and consequently this source of change in friction characteristic is practically eliminated. Another source of trouble in friction elements has been the tendency of modifiers, for instance oils, waxes, tars, asphalts, etc. to separate from the phenolic resin and bleed to the surface of the friction element; this causes a change of frictional characteristics during the life of the element which is a great source of trouble since the brake construction of an automobile may be designed for a brake lining having certain frictional characteristics but if the frictional characteristics of the lining change during the life of the lining, the brakes on the car may be either too powerful or too weak after several months of use. The heat hardening binder of the friction element, which is the subject matter of the present invention is sufficiently compatible with all of the usual modifiers so that if these are used in the usual commercial proportions they are securely held by the binder with substantially no tendency to bleed out of the friction element. Another source of difficulty which results in change of friction characteristics during continued use is the fact that in many friction elements, the surface of such friction element when made, has different frictional characteristics than the inner parts of the element so that as the brake lining wears, its frictional characteristics are subject to change. The frictional element using the heat hardening binder hereinafter described, is substantially uniform in all parts and the friction characteristics do not change as the lining wears. This tendency of a brake to change the friction characteristics is augmented by the heat generated during the application of the brake, which promotes the chemical reactions thus changing the frictional characteristics of the brake lining. Furthermore, lubricating oils and greases are substantially insoluble in the preferred binders and I have found that applied externally they have substantially no effect on its frictional properties. A frequent source of trouble with automobile and machinery brake lining is the result of oil contamination from bearing lubricant. In the present friction element lubricants are not absorbed by the binder, and oils and greases caught on the surface still have comparatively little effect on the friction element properly prepared with this binder.

There are also a number of other defects in the usual linings and these are overcome by the present friction element which is relatively repellent to foreign particles for instance, grit and road or metal dust which may find their way into the brake housing or come from the brake drum. Although the brake lining is of such a character that it easily grips the brake drum for braking purposes, it is in no way sticky and foreign particles will not easily adhere to it even when hot under braking conditions. Road dust and metal dust have less than the usual effect on the frictional characteristics of elements using this binder. The above defects in the usual frictional elements are noticeable after the element has been used over a period of months but are overcome in the present friction element.

There are also a number of defects in the usual friction elements which have a tendency to occur from day to day use, or at the time after a short period of disuse, when the brake is pressed against the drum, which are overcome by the present friction element. The heat hardened binder in the present element is substantially unaffected by water or gasoline so that the brakes can be depended upon even though gasoline is spilled on the lining or, more important still, the lining is effective during a rain storm or after washing the car. This is exceedingly important in the case of external brakes. Also, the friction characteristics of the brake lining do not change noticeably as the lining becomes heated. During the braking operation, the temperature of the brake parts rises from atmospheric temperature or about 60 degrees F. to a brake surface temperature from 200° to 600° F. or more. The friction characteristics of many brake linings are greatly changed during such a rise of temperature resulting in grab or slippage but the present lining does not grab or freeze to the brake drum but gives a smooth braking effect over all brake sections thus overcoming tendencies which cause skidding.

These and other objects and features of the invention will in part be obvious and in part be pointed out in the following specification which, however, is intended for purposes of illustrating the invention and not limiting it to the specific embodiments hereinafter given.

The invention will be described in connection with a brake lining, it being understood that the principles of the invention may be applied to other friction elements, for instance clutch facings.

The reactivity of phenolic materials when condensed with methylene yielding bodies is proportional to some extent to their molecular weight—the higher weight phenols becoming more sluggish—but more particularly to the number and position of the reactive positions present in the phenol and their relation to the hydroxyl group. Thus phenol, ortho, meta and para cresols, the various xylenols, resorcinol, etc. all form resins with formaldehyde, which resins differ somewhat in time required for resin manufacture, for heat hardening, etc. The intermediate resins from these different phenols differ to some extent in some properties, such as solubility, rate of change under moderate heating, etc. but the final products are all much alike in being hard, rigid, insoluble, resinous compounds which withstand heats up to about 300° F.

Distinguishing from the above, the present invention utilizes the discovery that the reactivity of the phenolic bodies can also be altered by the reactive character of the substituent; further, that the reactivity of such phenols may be made even greater than that of the lower molecular weight phenols as to the formation of infusible products by prior polymerization of the phenolic body; and that such infusible products maintain to a remarkable degree a stable condition under heat treatment. This has been accomplished by introducing into the phenol molecule a substance which is in itself reactive and capable of polymerization under heat and, furthermore, which carries this special reactivity into the phenolic stage.

It has been further found that the remarkable heat stability of these special phenolic-methylene derivatives is obtained whether the polymerized or the unpolymerized phenol is reacted upon by the methylene or substituted methylene compound. However other properties, such as hardening speed, final flexibility, etc. can be varied by polymerizing, or partly polymerizing, the phenol either before, during or after the reaction with active methylene.

The brake lining comprises a frictional filler, for instance asbestos, coke or metal particles which might be classed as semi-grinding or polishing heat stable solids, either in fibrous strength-imparting forms like woven or unwoven asbestos or in simple pigment or filler form like crushed coal or similar, either incombustible, or difficultly combustible material. The principal or main binder in the brake lining may in general be termed a phenolic derivative with active phenolic properties, of an unsaturated organic chemical, said phenolic compound being capable both of condensing with itself to form polymers and also of reaction with aldehydes to form infusible compounds, for instance, a drying oil, as tung oil or linseed oil, etc., a fatty acid from a drying oil, fatty oils in general, amylene, styrene, vinyl derivatives as divinyl or vinyl acetate or methyl divinyl, etc., this phenolic derivative or compound having been reacted with an aldehyde or ketone or methylene agent capable of condensing with the phenol to form a resinous condensation product. The unsaturated materials are those alkenes (including the di, tri, etc.) or the alkene-base materials which replace a ring hydrogen in the phenolic material and unite therewith to give a derivative, for example a phenol-alkene capable of polymerization and use by itself and also of uniting with formaldehyde or other aldehyde, ketone or methylene agent to produce an alkene-phenol-methylene condensation product, but do not include unsaturated non-alkene compounds, for instance such aldehydes as react with the phenolic hydroxyl group to neutralize the phenolic properties. The alkenes used may be ethylenic compounds such as the organic or inorganic esters of an ethylenic alcohol for example vinyl acetate or chloride, or an aryl or alkyl substituted ethylene for example styrene or amylene, or an aryl or alkyl substituted divinyl, an unsaturated hydrocarbon having more than one double bond for example phenyl divinyl or isoprene, or alkenynes for example divinyl acetylene, but preferably unsaturated fatty acids with a polyalkene base, usually of a drying oil, and their esters, in particular the polyhydric alcohol esters of an unsaturated fatty acid preferably of a drying oil, for example linoleic acid or tung oil fatty acids, or fatty oils and drying oils for example Perilla oil, tung oil, linseed oil, etc.

The preferred phenolic derivative which is first formed is a phenolic body capable of reacting with aldehydes and substituted in the ring with an unsaturated constituent but capable of further polymerization by itself, that is capable of polymerization by heat without the addition of aldehydes. The unsaturation of the organic chemical may be only partly satisfied so that the phenolic derivative is the reaction product of a phenol and an unsaturated compound wherein only part of the unsaturation is satisfied, for instance, the limited time or the limited ratio reaction product of a phenol with linseed or tung oil, drying oils and fatty acids therefrom, metastyrene and vinyl derivatives as divinyl or vinyl acetate or methyl divinyl. Furthermore, although the preferred phenolic derivative, as distinguished from the phenol-asphalt mixtures which do not heat harden by themselves, is capable of polymerization by heat without the addition of aldehydes, it is capable in either this polymerized or unpolymerized condition of reacting with aldehydes. The final product is thus one resulting from condensations involving first reactions of unsaturated organic compounds such as alkenes, alkapolyenes, alkenynes or their substituted derivatives, with phenols or substituted phenols and then condensed with methylene, substituted methylenes or aldehydes, which herein may be referred to as an alkene-phenol-methylene condensation product.

It is important to note that in the preparation of this binder, the phenolic body is combined with the unsaturated organic chemical that is, the alkene, to form the alkene-phenol, before any substantial amount of aldehyde or methylene agent is reacted into the compound first formed, otherwise a homogeneous binder, which has the previously mentioned desirable characteristics, will not be formed. The condensation reaction of a phenol with an aldehyde or methylene agent is well known. In the presence of strong catalysts, it appears to go forward in preference to the reaction whereby the phenol combines with the unsaturated organic chemical; thus if the phenol and aldehyde are first reacted and an unsaturated organic chemical, for instance tung oil is added, or if it is attempted in the presence of strong catalysts to simultaneously react the oil, phenol and aldehyde, the unsaturated fatty chemical is not firmly bound into the final condensation product and the oil will then come out of the combination, particularly when the brake lining is subjected to high temperatures, for instance the temperatures which are generated by automobile brakes during braking on a long hill.

When the alkene and the phenol are reacted, preferably in the presence of strong catalysts and at a relatively high temperature, the two ingredients are firmly bound together, apparently by a reaction which consists of a saturation of at least part of the unsaturated bonds but this is without loss of the effect of the phenolic hydroxyl group, as the resulting compound is phenolic in character and will unite with aldehydes, ketones, or other methylene agent. The final condensation product, however, is quite different from the usual phenolic resin and may be used alone or admixed with the usual type of phenol-aldehyde condensation product which may be formed from excess phenol. The final condensation product, that is, the alkene-phenol-methylene condensation product formed by the reaction of the methylene agent with the alkene-phenol (the unsaturated phenolic derivative of the unsaturated organic chemical), has certain characteristics which have been found to adapt it particularly to brake lining use. When reacted to the desired extent, by heat hardening the bond, it is exceedingly stable under all conditions of use, is substantially unaffected by outside influences, for instance, oil, water, grease, gasoline, grit, etc., its frictional characteristics are substantially unchanging either chemically or due to the temperatures occasioned by use of the brakes, yet previous to taking its final condition, it has a strong affinity for the usual modifiers in appreciable percentage, and will retain same even when the binder is in the final hardened condition, for instance additional amounts of resins, either natural or synthetic, asphalts, pitches, asphaltites, pyrogenous asphalts, drying oils, tars, rosin, etc. This is regarded as probably being due to the fact that the unsaturated compound formed by the reaction between the unsaturated chemical and the phenol, has certain characteristics of both the unsaturated organic chemical and the phenol; thus if low cost binders and modifiers such as asphalt, bitumen, tar, natural resins, polymerized fatty oils, linseed oil, etc., are added, which are compatible or blend well with the unsaturated organic chemical, these modifiers are very securely held in the binder while on the other hand, if the low cost binders or modifiers are of the type which are compatible or blend with the phenol, for instance unpolymerized fatty oils, phthalates, abietates, benzoates, and glycols, these modifiers are also securely held in the binder. The final binder which is used with the frictional filler, therefore, no matter whether it contains modifiers or not, is much more stable from every point of view than are binders which have heretofore been used. Thus, although the condensation product previously described may or may not be the greatest proportionate part by weight of the total binder, its effect is so pronounced, that when it is present in any substantial amount, for instance from 10% of the total binder on up, the total binder has the desirable characteristics attributed to this ingredient in greater proportion than would be expected from its proportional part of the total binder.

The characteristics of the main or principal binder may be altered by suitable changes in the amount and specific kinds of ingredients used in its preparation as well as in the conditions under which it is prepared. Phenol, for instance, imparts the property of faster curing while its homologs for instance cresol, xylenol, etc., change the characteristics of the final product by giving slower heat hardening products. Varying the amount and type of the unsaturated organic chemical also changes the characteristics of the final product. If tung oil is used, a flexible rubbery-like mass is formed and the greater the proportion of oil, the softer the final product. If linseed oil is used the amount desirable to use is limited by the effect of certain low friction impurities. If styrene is used the material is harder as well as more heat and solvent resistant. If vinyl esters are used the initial material is somewhat less compatible with oxidizing oils, etc. The characteristics of the final condensation product may also be changed by varying the amount of methylene agent, the less the amount of methylene agent, the softer the product. It is preferred, however, in all cases, to fully react the combined phenolic product as far as possible with the amount of methylene agent which is present, before the brake lining is used else the heat generated in braking may cause changes in the characteristics of the brake lining.

Tung oil is one of the preferred unsaturated organic chemicals as it is relatively low in cost and high in unsaturation value. This may be reacted with a phenol, for instance cresol, until a thick, viscous, liquid compound is formed. The reaction is preferably accelerated by a catalyst either basic or acidic. Mild bases, for instance CaO or ZnO are preferred in preference to caustics as the caustics tend to decompose the oils to acids and glycerine.

Substantially any acid catalyst either mineral or organic for instance sulphuric, hydrochloric, nitric, oxalic or phosphoric acid may be used. This resulting alkene-phenol compound may be reacted with a methylene agent as usual for any condensation reaction, the amount of aldehyde agent being determined as previously stated depending upon the hardness desired in the final condensation product. Either an acid or a basic catalyst may be used or the catalyst used in the alkene-phenol reaction and which remains along with the phenolic derivative of the organic chemical may be relied upon. It is not essential to use any catalyst and thus the catalyst in the said phenol-alkene may, if desired, be neutralized. The reaction with the aldehyde agent is temporarily stopped as by cooling in the soluble and easily mixable stage and before the condensation product has reached its final stage of reaction in order to incorporate the frictional fillers as well as to incorporate such modifiers as may be desired. The binder is preferably in a liquid state when the fillers are incorporated and this condition may be obtained by stopping the condensation reaction at such a point that the resin will be liquid at room temperatures. However, as the resin is readily soluble in further amounts of drying oils, the condensation reaction may be carried further than the liquid-resin stage and dissolved in the drying oils or the resin may also be dissolved in a solvent in order to incorporate the fillers and the modifiers.

The binder may be impregnated into any suitable base whether woven or unwoven; the friction element lacking the binder may first be fabricated as by a weaving or pulping process and thereafter be impregnated with the binder or the binder may be admixed with the mass of filler or coated thereon, and then the composition shaped into the brake lining, for instance by adding the binder to the water pulp composition, forming the mixture into sheets on a paper making machine, folding or laying up the sheets to the desired thickness and shaping the brake lining or coating discs for clutch facings, extruding the pulped mass, etc. Having incorporated such ingredients as are desired, or having impregnated a woven lining with the binder, brake elements are shaped in any suitable manner and subjected to heat to complete the condensation reaction or polymerization of the resinous ingredient.

*Example 1.*—100 parts of a commercial cresol mixture, containing about 5% phenol, 35% orthocresol, 35% metacresol, 15% paracresol, 10% xylenols and higher boiling phenols, 300 parts of tung oil and 5 parts of boric acid catalyst were reacted at from 120° C. to 220° C. for several hours. The particular ingredients given above were reacted for 2 hours at 180° C. to produce a thick, viscous, liquid compound. To the above compound (405 parts), 25 parts of hexamethylenetetramine were added and the mass reacted until a resin was obtained which was a rubbery solid at room temperatures and could be worked on rolls like crepe rubber.

*Example 2.*—100 parts of commercial phenol containing about 98% phenol and 2% of naphthalenes, thiophenes, cresols, pyridine etc., 200 parts of tung oil and 1 part of oxalic acid were reacted for three hours at 180–190° C. to give a viscous liquid of about 1,000 centipoises. To the above compound, 35 parts of paraformaldehyde were added along with 2 parts of zinc oxide and the mass reacted for 2 hours at 100° C. to give a viscous liquid of about 6,000 centipoises.

*Example 3.*—100 parts of commercial metapara cresol (containing about half metacresol and half paracresol) and 100 parts of vinyl acetate were refluxed in the presence of some of the evolved acetic acid or with added acid for instance 1 part of oxalic acid at 190–200° C. for approximately 24 hours. 35 parts of paraformaldehyde were added and reacted for 10 minutes at about 100° C. The resulting product was somewhat flexible, even when cured as much as 24 hours at 200° C., and was well adapted to be used without modifiers as a bond for brakes. This is in contrast to the known decomposition of vinyl acetate at 200° C. This material as well as the others herein disclosed held in a stable blend considerable amounts of various modifiers such as abietates, glycols, benzoates, phthalates, and unpolymerized fatty acids; for instance ethyl abietate, ethyl glycol dibenzoate, diethylene glycol, castor oil, etc.

*Example 4.*—100 parts of a commercial xylenol fraction, for instance that boiling between 200 and 230° C. and containing about 20% of a phenol, and cresol mixture, 200 parts linseed oil, and 10 parts zinc oxide were heated for 10 hours at 160° C. under vacuum of 10″ mercury, using a water cooled reflux. 25 parts hexamethylenetetramine were added and the mixture reacted 30 minutes at 105–110° C. to give a thick, viscous liquid when cold, which may be used for a hot saturating compound in brake lining or mixed with fillers for molded lining.

*Example 5.*—Reacted 94 parts pure phenol and 104 parts styrene in 100 parts ethyl benzene as a mutual solvent using as a catalyst 1 part oxalic acid, and the mixture refluxed for 10 hours. 35 parts paraformaldehyde were added and refluxed 30 minutes; then the solvent was removed under vacuum. A tough, heat reactive mass was obtained which cured to a product which was tough and sufficiently constant in weight at 600° F. for brake lining use. Modifiers, as asphalt, oils, etc. were best added either along with the paraformaldehyde, or else before the compound had set to the tough stage.

Other suitable variations of the compound included those made with from 50 to 400 parts xylenol, or alkyl or aryl substituted phenols, for instance tertiary butyl or tertiary amyl or phenyl phenol in place of the phenol or cresol. Also from 50 to 400 parts of other drying oils for instance linseed oil, or the free fatty acids from oils, or styrene, or Perilla oil, soya bean oil, oiticica oil, may be used in place of the tung oil. If reacted to the condition where they are solid when cold, these resinous products may be taken up in sufficient solvent liquid to be used as impregnants for woven lining or to be kneaded with fillers for a molded lining. If the resinous products are liquids at warm temperatures, the solvents can be used as thinners. After heating sufficiently to complete the chemical reactions, the braking surface of the brake lining was neither dry nor crumbly nor oily nor wet but had a smooth and unctuous surface possessing excellent braking qualities. The brake linings were exceedingly long wearing and did not grab or freeze to the brake drum. The binder cured uniformly through all parts, during the heating, as the phenol and organic material were in combination and hardened with formaldehyde as a unit, so that the friction characteristics were unchanged as the brakes wore down. None, for instance, of the oil component came out of the lining during use and the lining was flexible enough to conform to the brake shoes as well as the brake drum, either hot or cold, being somewhat springy, rubbery and extensible and retained these properties under the heat of friction and in the air as the binder does not oxidize even under heat. The uniform flexibility and stability was maintained throughout the life of the brake lining and there was substantially no change in the friction index. The linings were infusible in the sense that the binder would not soften and flow under heat and the characteristics did not greatly change at temperatures up to 600° F. or more. During manufacture of the lining and after sufficient heating, the binder had polymerized to a point of heat stability where it would not further harden appreciably up to temperatures of 600° F. or more and would not break down or sweat out the ingredients at these temperatures even if decomposition of the lining occurred under the high heat of hard braking use. Also the linings were substantially indifferent to outside conditions such as lubricating oils, grit, water, and metal particles, these outside conditions being readily shed with no substantial effect on the frictional curve.

A great advantage of the binders thus made is that lower cost binders and friction modifiers may easily be blended in the binder mixture without decreasing the desirable qualities of the brake lining nearly as much as would be expected. The principal or main binder has remarkably high friction augmenting qualities and is believed to be the first material of this kind which is infusible and heat resistant, with the ability to carry these desirable properties into a distended mass and prevent the change of properties at temperatures of 600° F. or more.

The usual low cost binders are asphalts, tars, drying, semi-drying and non-drying oils, and natural resins for instance rosin, copal, other synthetic resins, cumarone, etc. Rubber, rubber latex, polymerized halogenated divinyl materials may also be used as modifiers. All of these blend well with the previously described main or principal binder and appear to enter into some form of physical or chemical combination which is more than mere solubility. For instance, certain xylenol-formaldehyde resins may be dissolved in drying oils to form a mixture with the same starting materials and proportions as previously described for the main or principal binder, However, the final products so made, when compared as to effect in frictional bonds, are very different especially as to the destructive effect of heat thereon. The material containing resin dissolved in oil, works fairly well at low temperatures and even up to temperatures of about 200° C. but at about this temperature it changes under heat in a very objectionable manner for a friction element, that is, on heat destruction, it gives a proportion of oily fluid which greatly and abruptly changes the frictional character of the over heated product. In trade practice, the friction of the element is then described as having "faded". On the other hand, the main or principal condensation product made as previously described, even through originally made with oil, does not depolymerize to an oily material and is not greatly affected by fading under excessive heat abuse, and can carry this property into binders using modifiers, in an unexpected measure. In the usual phenol-oil mixtures, which are reacted with formaldehyde, the phenol and oil harden separately, the phenol hardening by reaction with the formaldehyde and the oil absorbing more or less oxygen. At first the oxidation is usually only at the surface, so that as the brake is applied on a relatively new lining, the surface of the lining breaks down and the inner oil comes to the surface but as the lining ages, particularly under repeated heatings or hard use, the oil oxidizes more and more and thus the properties of the lining are constantly changing. However in the present lining the phenol and the original oil or unsaturated chemical are bound together and this combination has the property of binding modifiers into the combination as well as promoting the chemical reactions of the modifiers which otherwise would not be accomplished except very slowly, so that even though relatively large amounts of modifiers are used they are firmly held and do not sweat or bleed out of the lining nor do they materially change their characteristics during use, particularly in the matter of oxidation.

The following is an example of a modified binder used in an impregnated lining:

*Example 6.*—80 parts by weight of an unimpregnated brake lining fabric, for instance, a tape, web, strip or the like of woven asbestos material with or without wire, was impregnated with 20 parts by weight of impregnating solids taken up in a small amount of appropriate solvent, sufficient to effect the impregnation. The binder used in the above impregnation consisted of the following materials and proportions by weight:

| | Parts |
|---|---|
| Asphalt | 4 |
| Tung oil—preferably raw | 6 |
| Linseed oil—preferably raw | 4 |
| The main or principal binder described in Example 1 | 4 |
| Wood tar | 1 |
| Mixed addition materials such as driers for the raw oil, etc. if desired | 1 |

This mixture of solids and liquids was blended together with sufficient solvents, for instance gasoline or coal tar solvents, to obtain a working fluidity depending upon the method of impregnation desired, for example, 1 part by weight of solvent to 1 part of the above mixture gives a very fluid impregnant for a cold dipping bath without the need of pressure. The impregnated lining may be used when free from solvents and is preferably heat treated to an infusible condition for use.

*Example 7.*—A molded lining material using a main or principal binder without modifiers, was made from about 20% binder and 80% filler in which the filler was ground coke. Short fiber asbestos may be used for the filler and metal particles are sometimes added as part of the filler content. 300 parts of the binder of Example 2 was blended with 50 parts of solvent liquid and dispersed in a kneader over about 1200 parts of filler, rolled or extended to sheet form and then heated in a shaping mold to give a rigid, curved place to fit a curved braking surface. The binders of Examples 3, 4 and 5 also gave suitable unmodified curved braking surfaces. The binder of Example 1 reacted to a less extent could also be used in the kneader or if reacted as indicated could be mixed on the rolls.

In each of the above cases, the heat treatment appears to produce a reaction which is essentially a polymerization and combination of the ingredients with each other, since the inside particles have practically the same frictional and heat resistant characteristics as have the particles nearer the surface. The main or principal binder previously described appears to promote uniformity throughout the entire mass and produce a friction element which has long life together with friction characteristics which are substantially unchanged during all conditions of use.

As compared with oxidized oil, this class of binder retains its toughness over a wider range of temperatures particularly at low temperatures and shows less tendency to reliquefy at higher temperatures. As compared with hard vulcanized rubber, it shows less tendency to fade under heat and less tendency to soften at high temperatures; also it is more highly penetrative than rubber for asbestos products in general and particularly for dense structures. As compared with the usual mixture of rubber and resin and the usual combination of drying oil and resin, when cured to a state of heat stability, it shows a better flexibility. Furthermore, the bond contains within itself all the ingredients necessary for complete polymerization, that is, it does not require the admixture of oxidizing agents as do many of the oils; and due to its homogeneous nature, that is, due to the fact that hardening agents and other fillers are not necessary for the complete cure of the bond, the binder and the friction material are more simple to make and easier to manufacture.

From the previous description and examples, it is apparent that many variations may be made in the preparation of the main or principal binder, the incorporation of lower cost binders and modifiers, fillers, etc. as well as modifications in the manner in which the friction element is prepared in its final form. It is, therefore, desired that the invention be construed as broadly as the following claims taken in conjunction with the prior art, may allow.

I claim:

1. Brake lining, clutch facing and the like element including a frictional filler in discrete particles and a binder comprising the condensation product of an aldehyde with an alkene-phenol, said condensation product being present in an amount sufficient to maintain substantially constant friction characteristics over an extended period of time.

2. Brake lining, clutch facing and the like element including a frictional filler in discrete particles and a binder comprising the condensation product of an aldehyde with an alkene-phenol, said condensation product being reacted until substantially stable and infusible at 600° F. and being present in an amount sufficient to maintain substantially constant friction characteristics over an extended period of time and up to temperatures of substantially 600° F.

3. Brake lining, clutch facing and the like element including a frictional filler in discrete particles and a binder comprising the condensation product of an aldehyde with an alkene-phenol, said binder having a friction modifier incorporated therewith and the condensation product being present in an amount sufficient to maintain a bond which is substantially stable in chemical and frictional characteristics over an extended period of time.

4. Brake lining, clutch facing and the like element including a frictional filler in discrete particles and a binder comprising the condensation product of an aldehyde with an alkene-phenol, said binder having incorporated therewith a friction modifier compatible with the alkene constituent, the condensation product being present in an amount sufficient to prevent any substantial amount of the modifier bleeding to the surface.

5. Brake lining, clutch facing and the like element including a frictional filler in discrete particles and a binder comprising the condensation product of an aldehyde with an alkene-phenol, said binder having incorporated therewith a friction modifier compatible with the phenol constituent, the condensation product being present in an amount sufficient to prevent any substantial amount of the modifier bleeding to the surface.

6. Brake lining, clutch facing and the like element including a frictional filler in discrete particles and a binder comprising the condensation product of an aldehyde with an alkene-phenol, said alkene-phenol being capable before condensation of taking up more alkene, the binder being substantially completely reacted to maintain substantially constant friction characteristics during an extended period of use.

7. Brake lining, clutch facing and the like element including a frictional filler in discrete particles and a binder comprising the condensation product of an aldehyde with an alkene-phenol, said alkene-phenol being capable before condensation of polymerizing to a higher melting modification, the condensation product being polymerized to a substantially stable chemical state.

8. Method of producing brake lining, clutch facing and the like elements which comprises reacting a phenol with an alkene to produce an alkene-phenol, reacting this with an aldehyde to produce a resinous condensation product, incorporating a filler and forming into said friction elements, the condensation product being present in an amount to maintain substantially constant friction characteristics during an extended period of time.

9. Method of producing brake lining, clutch facing and the like elements which comprises reacting a phenol with an alkene to produce an alkene-phenol, reacting this with an aldehyde to produce a resinous condensation product, incorporating a filler and forming into said friction elements and reacting the condensation product until substantially stable and infusible at 600° F., the condensation product being present in an amount sufficient to maintain substantially constant friction characteristics over an extended period of time and under temperature changes up to 600° F.

10. Method of producing brake lining, clutch facing and the like elements which comprises at least partially satisfying the bonds of an alkene with a phenol, reacting this compound with a phenol-reactive methylene containing condensing agent to produce a resinous condensation product, incorporating a filler and forming into said friction elements, the condensation product being present in sufficient amount to maintain the friction characteristics substantially constant during an extended period of use.

11. Method of producing brake lining, clutch facing and the like elements which comprises reacting a phenol with an alkene to produce an alkene-phenol, reacting this compound with an aldehyde to a point where the reaction product will combine with a friction modifying agent, incorporating a plastic friction modifying agent and a frictional filler, and thereafter forming and hardening said friction elements of the desired size, the said reaction product being present in sufficient proportion to hold the modifying agent in substantially homogeneous combination during use of the lining.

12. Method of producing brake lining, clutch facing and the like elements which comprises reacting a phenol with an alkene to produce an alkene-phenol, reacting this compound with an aldehyde to a point where the reaction product is compatible with a friction modifying agent, incorporating a plastic friction modifying agent and a frictional filler, and thereafter forming and hardening said friction elements of the desired size, the said reaction product being present in sufficient amount to prevent the modifying agent from sweating to the surface of the element.

13. Method of producing brake lining, clutch facing and the like elements which comprises reacting a phenol with an alkene to produce an alkene-phenol, reacting this compound with an aldehyde to a point where the reaction product is compatible with a hardenable friction modifying agent, incorporating a plastic friction modifying agent and a frictional filler, and thereafter forming and hardening said friction elements of the desired size, the said reaction product being present in an amount sufficient to produce a substantially permanently homogeneous mass which maintains this characteristic over an extended period of time during use.

HOWARD L. BENDER.